United States Patent [19]
Grass

[11] 3,929,387
[45] Dec. 30, 1975

[54] DRAWER GUIDE FOR HEAVY DRAWERS

[76] Inventor: Alfred Grass, Konsumstrasse 492, A-6973 Hochst, Vlbg.-Osterreich, Austria

[22] Filed: May 13, 1974

[21] Appl. No.: 469,618

[30] Foreign Application Priority Data
May 15, 1973 Germany............................ 2324558

[52] U.S. Cl.................. 308/3.8; 308/6 R; 312/339; 312/341
[51] Int. Cl.² .............................................. F16C 17/00
[58] Field of Search................. 308/6 R, 3.6, 3.8; 312/334, 335, 338, 339, 340, 341

[56] References Cited
UNITED STATES PATENTS

| | | | |
|---|---|---|---|
| 1,172,711 | 2/1916 | Hunter | 312/339 |
| 1,537,067 | 5/1925 | Card | 308/6 R |
| 2,566,186 | 8/1951 | Gillett | 308/3.8 |
| 2,799,541 | 7/1957 | Wolters | 312/341 |

FOREIGN PATENTS OR APPLICATIONS

| | | | |
|---|---|---|---|
| 837,474 | 9/1960 | France | 308/6 R |
| 1,346,191 | 11/1963 | France | 308/6 R |
| 188,879 | 2/1957 | Germany | 312/339 |

*Primary Examiner*—Charles J. Myhre
*Assistant Examiner*—R. H. Lazarus

[57] ABSTRACT

A drawer support is described utilizing a triangular support member riding on three rollers in a channel on the drawer housing. An elongated slide attached to the drawer rides between the rollers.

9 Claims, 4 Drawing Figures

DRAWER GUIDE FOR HEAVY DRAWERS

The invention relates to a drawer guide or support with fixed stops and moveable guides whereby the load support follows over freely guided cylindrical bodies.

According to previously known constructions, the cylindrical bodies were constructed as rollers. In one of the stopped guides, for example, they were prevented from falling out in that the other guide had bearing surfaces which at the same time served as a support for the cylindrical bodies. In this embodiment, which worked with only two rollers, it was possible that, especially with heavy or unsymmetrically loaded drawers, the drawer would tip when it was fully withdrawn. The same result could occur if it were fully pushed-in. It was then difficult to pull-out. Strengthening of the guides, in order to carry heavier loads, was not really possible because guide slits were necessary in order to guide the pins of the rollers. These slits caused a substantial weakening and the load capacity of these guides was thereby substantially reduced.

In accordance with the invention, guides with smaller cross-section can support greater loads, and especially secure the drawer against tipping, if they are supported at their endpoints, i.e. during withdrawal and insertion.

Proceeding from a drawer guide with lateral fixed stops and moveable guides and cylindrical bodies which are in the form of rollers in one, for example, fixed-stop guide, which is provided for example with projections to prevent it from falling out, wherein the other guide has bearing surfaces, which at the same time serve as the support for the cylindrical bodies, the invention resides in the pins of the rollers being secured on a support whose connecting lines form a triangle, on whose apices the opposing rollers are provided. With the drawer pulled-out, one roller on the support is against the corner stop, a support roller is in front of the triangle, and to the rear a securing roller is provided.

In accordance with this feature, a support for three rollers is also provided. This has the advantage of not only the elimination of two rollers and the slits in the two guides, but the load is distributed over a greater surface of the support on the guide.

A particular embodiment consists in that the connecting lines form an equilateral triangle with an acute apex angle and acute base angles.

It is simple to construct and simple to install if the supports are formed of plastic material and the pins are attached.

Further, it is advantageous the rims secured to the drawer have a U-shaped cross-section which has a short shank above and below the guide surfaces for the rollers and a rim on its end for the corner stop.

It is likewise possible that this rim be constructed as a flat profiled rim forming with both guide surfaces the corner stop at the end.

It is essential that the rim, which is secured to the body, have a U-profile, whose short shanks are provided with cornered attachments, for fixedly securing the rollers, whereby the support 25 is guided between the short shanks.

By these measures it is provided, apart from the foregoing, that rim weakening through the slits is eliminated by provision of an additional carrying part, which carries the pins of the rollers, so that over the entire cross-section of the carrier the load is widely distributed on the U-rims. Thus the specific large surface load, according to the known construction, carried in the proximity of the slits by the roller pins, is eliminated.

The load support of the pins on the support can be varied. A possibility exists in that the support is provided with fixed bores in which pins, secured in the body side, can be inserted.

An exemplary embodiment is shown in the drawing. The invention will therefore be described further with reference to the drawing.

Figure 1:
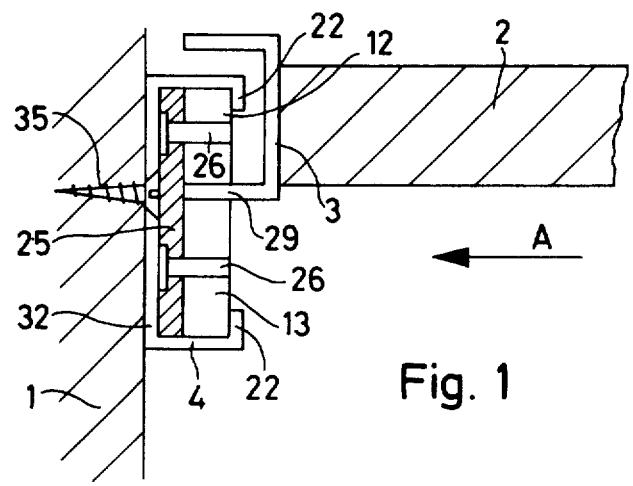
FIG. 1 shows schematically a section of the arrangement of the body, drawer, and cylindrical bodies, i.e. rollers, provided therebetween.

In the figures the supporting body or housing 1 with drawers, i.e. the drawer bottoms 2, is shown. The load support on the body 1 is provided by elongated members or rims 3, which are secured on both sides of the drawer to a support roller 13 and an opposing roller 12, which are secured against falling out by rim 4, which is securely fastened to the body 1, which is illustrated schematically by screw 35.

The load support of the rollers 12, 13 on the rim 4 is via a support 25. This support is, according to one embodiment of the invention, so constructed that its sides are, at the same time, the connecting lines 28 between pins 26 secured to the carrier 25. On these pins rollers 12, 13 are placed. Projections 22 form rims which prevent rollers 12, 13 from falling out after the drawer is pulled-out. These rollers are then inserted with the support vertical to the plane of the paper in FIG. 1. On the drawer, the rim 3 is secured, thus between the rollers 12, 13, 24. A rim 23, which operates as a restraint or stop, prevents the drawer, in the direction of pull-out, from falling out.

Figure 2:
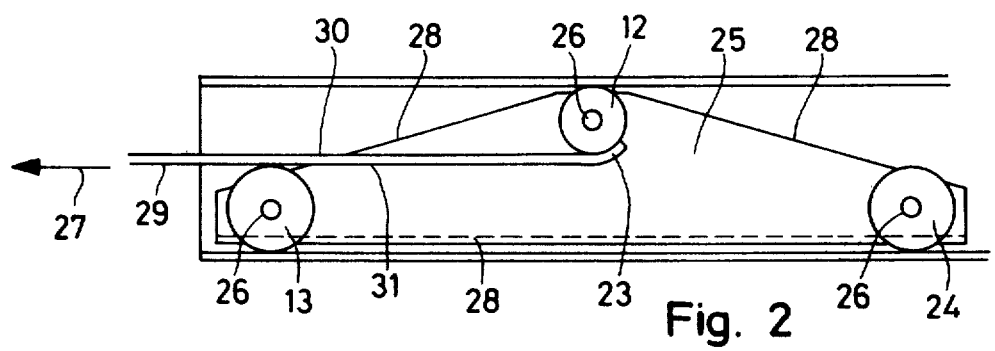
FIG. 2 shows schematically a view in the direction of A in FIG. 1, without a drawer.

From FIG. 2 it can be seen that in this position the stop roller 12 prevents the drawer 2 from tipping downwardly away. The distance between fixed roller 13 and opposite roller 12 is therefore enlarged through this by a further additional roller 24, so that a very much greater turning moment is realized, especially because this roller 24 is in the same plane as roller 13. The pins 26, in FIG. 1 and 2, can be molded with the support 25 which preferably consists of a plastic material.

Figure 4:
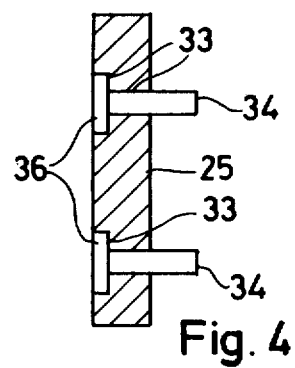
FIG. 4 shows one construction for securing the pins in the support.

It is also possible, as shown in FIG. 4, to provide support 25 with disposed bores 33, into which the pins 34 can be inserted, from the body side, with their heads 36 bound with the side facing the body. The separation between the short shanks of the U-shaped rim 4 then is so dimensioned, that the movable support 25 can be moved back and forth without tipping. The length of the projections 22 is so dimensioned that they only project slightly toward the middle of the rollers, in order to minimize friction.

Figure 3:
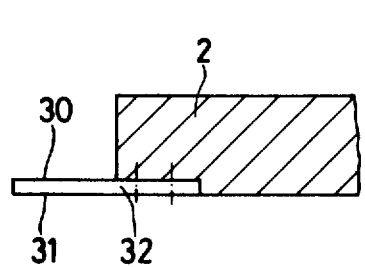
FIG. 3 shows one construction of a rim, which is secured on the drawer.

Instead of a U-shaped projecting rim 3, which is secured to the drawer, a flat profile 32 can be employed, as shown in FIG. 3, whereby likewise the roller bearing surfaces 30, 31 are again provided, and at the end of this flat profile, a stop rim 23. It is certainly possible to permit the bottom of the drawer, particularly if it is a steel drawer, to extend so far beyond the sides of the drawer, that this widened drawer bottom, at the same time, takes over the function of the rim 3.

In accordance with the height of the side-wall of the drawer and the necessity, the apex angle of the triangle can be obtuse or right-angle, or if necessary sharply pointed, as well. It is always necessary that the load be carried on a triangular support, the pins of the cylindrical bodies serving only for longitudinal support, the essential load being carried over the roller cross-section, so that there is no resulting friction as the load moves across the support. According to the weight distribution in the drawer an equilateral triangle or a non-equilateral triangle can be used, which is formed by the connecting lines between the pins 26 which secure the positions of the rollers 12, 13, 24. The support 25 itself is likewise largely separated from the load support, for the load-support separately follows over the bearing surfaces 30, 31 of the rim 3 over the cross-section of the rollers, or respectively, cylindrical bodies, on the short shanks of the U-shaped profile of the rim 4. These shanks then transport the load over the connecting piece 37 of the shanks and screw 35 on the body 1. An extremely easy and trouble-free movement is achieved by the fixed portions of the rollers 12, 13, 24, which are secured in their position on the support 25 through pins 26.

What is claimed is:

1. A drawer support to be secured to a housing, comprising a guide member forming an elongated channel with upper and lower bearing surfaces, a movable load support member in the channel, three cylindrical bodies, means for journalling said cylindrical bodies at only three spaced positions on the load support member, said three journalling positions being located such that straight lines joining them form a triangle whose base generally parallels the lower bearing surface of the guide member, said load support member being positioned in the channel with the cylindrical bodies journalled at the triangle base engaging the guide member lower bearing surface and the cylindrical body journalled at the triangle apex engaging the guide member upper bearing surface, the base-journalled cylindrical bodies being located in the proximity of the corners of the load support member, means for mounting on the drawer and forming an elongated member extending between the apex-journalled cylindrical body and the base-journalled cylindrical bodies and engaged by at least the apex cylindrical body and the base cylindrical body forward of the apex cylindrical body, and means for mounting of the guide member on the drawer housing.

2. A drawer support as claimed in claim 1, and further comprising stop means on the elongated member for engaging the apex-journalled cylindrical body for stopping the drawer when in a pulled-out position.

3. A drawer support as claimed in claim 2, wherein the journalling means are pins, and the load support member is constituted of plastic material with the pins molded integrally therewith.

4. A drawer support as claimed in claim 2, wherein the guide member has a generally U-shaped cross-section with a rim portion at its ends to contain the cylindrical bodies.

5. A drawer support as claimed in claim 2, wherein the elongated member for mounting on the drawer has a generally U-shaped cross-section with one of the U-arms forming on opposite sides bearing surfaces for the cylindrical bodies.

6. A drawer support as claimed in claim 2, wherein the elongated member for mounting on the drawer is a generally flat member whose opposite surfaces constitute bearing surfaces for the cylindrical bodies.

7. A drawer support as claimed in claim 2, wherein the journalling means comprise pins mounted in bores in the load support member.

8. A drawer support as claimed in claim 2, wherein the elongated member is fixedly mounted on the drawer, the guide member is fixedly mounted on the housing, and the cylindrical bodies are rollers.

9. A drawer support as claimed in claim 2, wherein the triangle formed by lines connecting the journalling positions is an equilateral triangle.

* * * * *